(12) United States Patent
Kotary et al.

(10) Patent No.: US 10,180,800 B2
(45) Date of Patent: Jan. 15, 2019

(54) AUTOMATED SECURE DATA AND FIRMWARE MIGRATION BETWEEN REMOVABLE STORAGE DEVICES THAT SUPPORTS BOOT PARTITIONS AND REPLAY PROTECTED MEMORY BLOCKS

(71) Applicant: Intel Corporation, Santa Clara, CA (US)

(72) Inventors: Karunakara Kotary, Portland, OR (US); Krishna Kumar Ganesan, Hillsboro, OR (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 15/448,380

(22) Filed: Mar. 2, 2017

(65) Prior Publication Data

US 2018/0253238 A1 Sep. 6, 2018

(51) Int. Cl.
*G06F 3/06* (2006.01)
*H04L 9/32* (2006.01)
*G06F 12/14* (2006.01)
*G06F 21/57* (2013.01)
*G06F 9/4401* (2018.01)

(52) U.S. Cl.
CPC ............ *G06F 3/0619* (2013.01); *G06F 3/062* (2013.01); *G06F 3/065* (2013.01); *G06F 3/0647* (2013.01); *G06F 3/0679* (2013.01); *G06F 9/4401* (2013.01); *G06F 12/1408* (2013.01); *G06F 21/575* (2013.01); *H04L 9/3234* (2013.01); *G06F 2212/1052* (2013.01)

(58) Field of Classification Search
CPC .................. G06F 3/0646–3/065; G06F 21/572
See application file for complete search history.

(56) References Cited

U.S. PATENT DOCUMENTS

2008/0162947 A1* 7/2008 Holtzman ............... G06F 21/10
713/193
2015/0154031 A1* 6/2015 Lewis ................... G06F 9/4406
713/2

(Continued)

FOREIGN PATENT DOCUMENTS

EP 2759955 A1 * 7/2014 ............. G06F 21/53
EP 2887607 A1 * 6/2015 ............. G06F 21/53

OTHER PUBLICATIONS

Sabt et al. "Trusted Execution Environment: What It Is, and What It Is Not." 2015. IEEE. 2015 IEEE Trustcom/BigDataSE/ISPA. pp. 57-64.*

(Continued)

Primary Examiner — Nathan Sadler
(74) Attorney, Agent, or Firm — Jordan IP Law, LLC (57) ABSTRACT

Systems, apparatuses and methods may include technology that detects a migration request and conducts a first transfer, via a trusted execution environment (TEE), of storage context information from a first removable storage device to a secure memory region of a system in response to the data migration request. Additionally, the technology may conduct a second transfer, via the TEE, of the storage context information from the secure memory region to a second removable storage device, wherein the storage context information includes factory data, security data and boot firmware.

24 Claims, 7 Drawing Sheets

(56) References Cited

U.S. PATENT DOCUMENTS

| | | | |
|---|---|---|---|
| 2015/0261950 A1* | 9/2015 | Schulz | G06F 21/51 726/22 |
| 2016/0378976 A1* | 12/2016 | Kotary | G06F 21/53 713/193 |
| 2017/0185538 A1* | 6/2017 | Khan | G06F 12/1466 |
| 2018/0081666 A1* | 3/2018 | Surdu | G06F 8/65 |
| 2018/0097639 A1* | 4/2018 | Gulati | H04L 9/3263 |

OTHER PUBLICATIONS

Samsung, "Samsung eMMC: Managed NAND Flash Memory Solution Supports Mobile Applications", 2013, 6 pages.

Allyn Malventano, "IDF 2016: Intel to Demo Optane XPoint, Announces Optane Testbed for Enterprise Customers", retrieved from -pcper.com-, Aug. 16, 2016, 6 pages, Wikipedia, "Universal Flash Storage", retrieved from -wikipedia. org-, Dec. 10, 2016, 2 pages.

\* cited by examiner

AUTOMATED SECURE DATA AND FIRMWARE MIGRATION BETWEEN REMOVABLE STORAGE DEVICES THAT SUPPORTS BOOT PARTITIONS AND REPLAY PROTECTED MEMORY BLOCKS

TECHNICAL FIELD

Embodiments generally relate to data migration management. More particularly, embodiments relate to automated secure data and firmware migration between removable storage devices, wherein the migration supports boot partitions and replay protected memory blocks.

BACKGROUND

Peripheral Component Interconnect (PCI) Express (PCIe, e.g. PCI Express Base Specification Revision 3.1a, released Dec. 7, 2015) is a high-speed serial computer expansion bus standard. Non-volatile memory (NVM) EXPRESS (NVME, e.g. NVM Express Specification version 1.2, released Nov. 3, 2014) is an optimized, high-performance scalable host controller interface designed to address the needs of enterprise and client systems that utilize PCIe-based solid-state storage.

Storage device technologies such as NVME, Universal Flash Storage (UFS), embedded MultiMediaCard (eMMC) and other block media technologies may have traditionally soldered memory chips onto a motherboard chassis in a ball grid array (BGA) form factor. In recent developments, desktop computers and servers may include storage devices having removable form factors that enable storage upgrades (e.g., replacing an existing NVME compliant storage device with a new NVME compliant storage device). While the ability to upgrade storage devices may be advantageous from an end user perspective, there remains considerable room for improvement.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Storage devices may contain factory data, boot firmware, security data and other system data stored in numerous different partitions, wherein a replacement storage device may not operate properly without the system data from the storage device being replaced. Technology described herein may address this area and other areas of concern.

Figure 1:
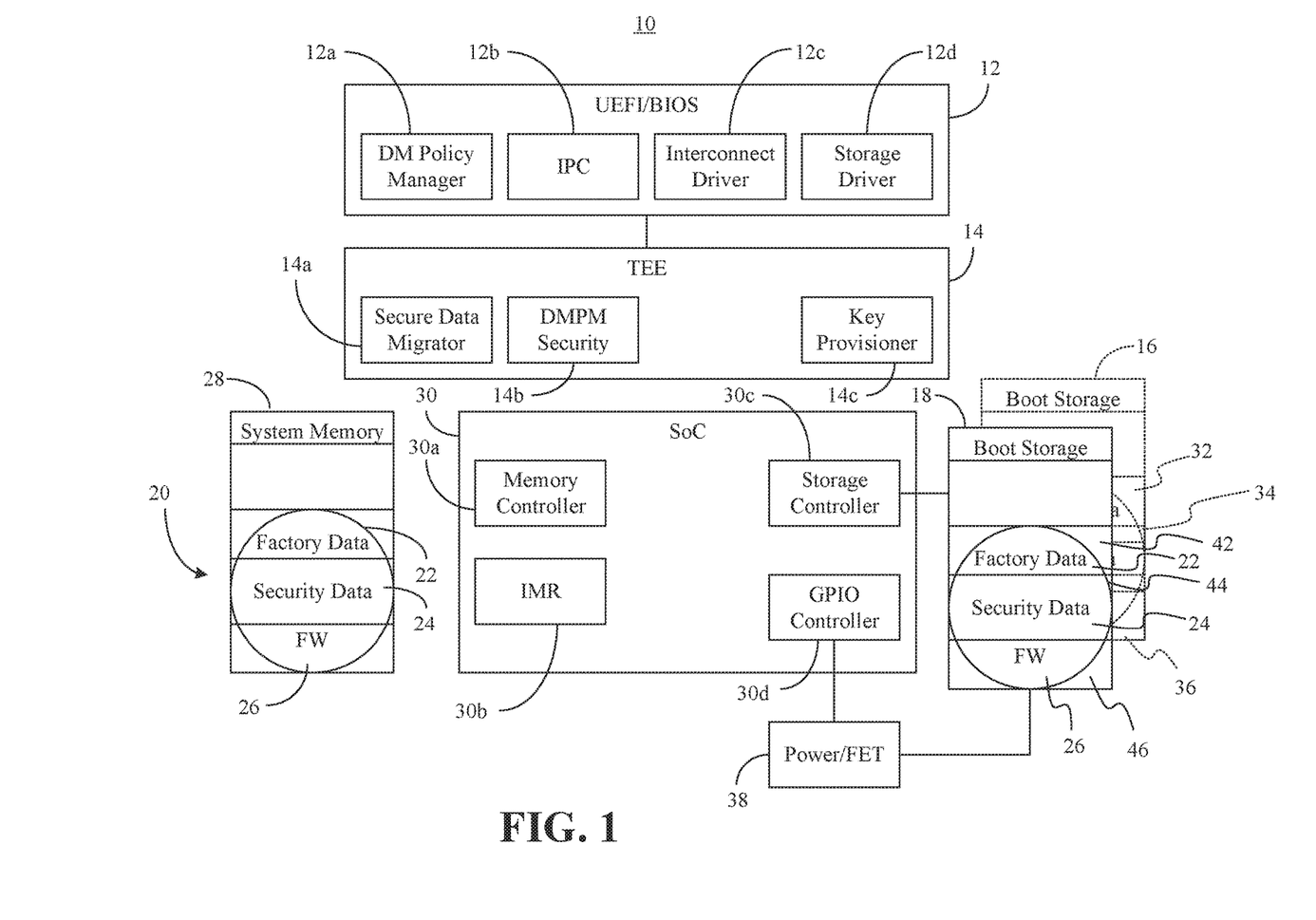
FIG. 1 is a block diagram of an example of a storage based computing system according to an embodiment.

FIG. 1 shows a storage based computing system 10 in which a boot subsystem 12 (12a-12d, e.g., unified extension firmware interface/UEFI, basic input output system/BIOS, etc.) is communicatively coupled with a trusted execution environment (TEE, 14a-14c) 14. The TEE 14 may generally be a hardware-based secure area that resides in a host processor (not shown) and protects code and data loaded inside the TEE 14 with respect to confidentiality and integrity. In the illustrated example, the boot subsystem 12 includes a data migration (DM) policy manager 12a (e.g., data migration management apparatus), an inter processor communication (IPC) component 12b, an interconnect driver 12c (e.g., PCIe driver) and a storage driver 12d.

The boot subsystem 12 and the TEE 14 may generally enable the migration of storage context information from a first removable storage device 16 (e.g., first "boot storage") to a second removable storage device 18 (e.g., second "boot storage"). The migration of the storage context information may be in accordance with an upgrade from the first removable storage device 16 to the second removable storage device 18, an expansion of capacity from the first removable storage device 16 to the second removable storage device 18, etc., or any combination thereof. In either scenario, the second removable storage device 18 may be considered "hot pluggable" to the extent that the second removable storage device 18 may be connected to the system 10 while the system 10 is powered on.

More particularly, the DM policy manager 12a may be configured to detect a data migration request (e.g., BIOS setup, operating system/OS knob and/or UEFI shell command change) and conduct a first transfer, via the TEE 14, of storage context information from the first removable storage device 16 to a secure memory region 20 of the system 10 in response to the data migration request. The storage context information may be encapsulated in the secure memory region 20, which may reside in system memory 28 (e.g., dynamic random access memory/DRAM) or other suitable location. The DM policy manager 12a may also conduct a second transfer, via the TEE 14, of the storage context information from the secure memory region 20 to the second removable storage device 18.

As will be discussed in greater detail, the storage context information may include factory data 22 (e.g., namespace, modem, WiFi and/or Bluetooth data), security data 24 (e.g., certificate and/or replay protected memory block/RPMB data) and/or boot firmware (FW) 26. The storage context information may also include an operating system (OS) image, an OS recovery image and user data (not shown). In one example, the factory data 22 initially resides in a factory partition 32 of the first removable storage device 16, the security data 24 initially resides in a security partition 34 of the first removable storage device 16, and at least a portion of the boot firmware 26 initially resides in a boot partition 36 of the first removable storage device 16. The DM policy manager 12a and the TEE 14 may write the factory data 22 to a factory partition 42 of the second removable storage device 18, write the security data security data 24 to a security partition 44 of the second removable storage device 18, write the boot firmware 26 to a boot partition 46 and write the OS image, the OS recovery image and the user data to one or more remaining partitions (e.g., OS partitions) of the second removable storage device 18. If the factory partition 46 does not already exist in the second removable storage device 18 (e.g., not configured prior to shipment), the DM policy manager 12a and the TEE 14 may create the factory partition 46 in the second removable storage device. The DM policy manager 12a and/or the boot subsystem 12 may be implemented in logic instructions, configurable logic, fixed-functionality hardware logic, etc., or any combination thereof.

In one example, a DM policy manager (DMPM) security component 14b of the TEE 14 establishes the secure memory region 20 in the system memory 28 and the DM policy manager 12a instructs a secure data migrator 14a of the TEE 14 to provision the second removable storage device 18 with a replay protected memory block (RPMB). In such a case, a key provisioner 14c may generate a key to be stored in the RPMB. Additionally, the IPC component 12b may facilitate communications between the boot subsystem 12 and the TEE 14. In one example, the first removable storage device 16 and/or the second removable storage device 18 are connected to the system 10 by a system on chip (SoC) 30 (30a-30d), which includes a memory controller 30a, an IMR (isolated memory region) 30b, a storage controller 30c and a general purpose input output (GPIO) controller 30d. The interconnect driver 12c may facilitate communications between the boot subsystem 12 and the storage controller 30c. The system 10 may also include a power transistor (e.g., field effect transistor/FET) 38 to facilitate communications between the GPIO controller 30d and the removable storage devices 16, 18. The removable storage devices 16, 18 may include PCIe NVME compliant storage devices such as, for example, NAND and/or INTEL 3DXPOINT devices.

Figure 2:
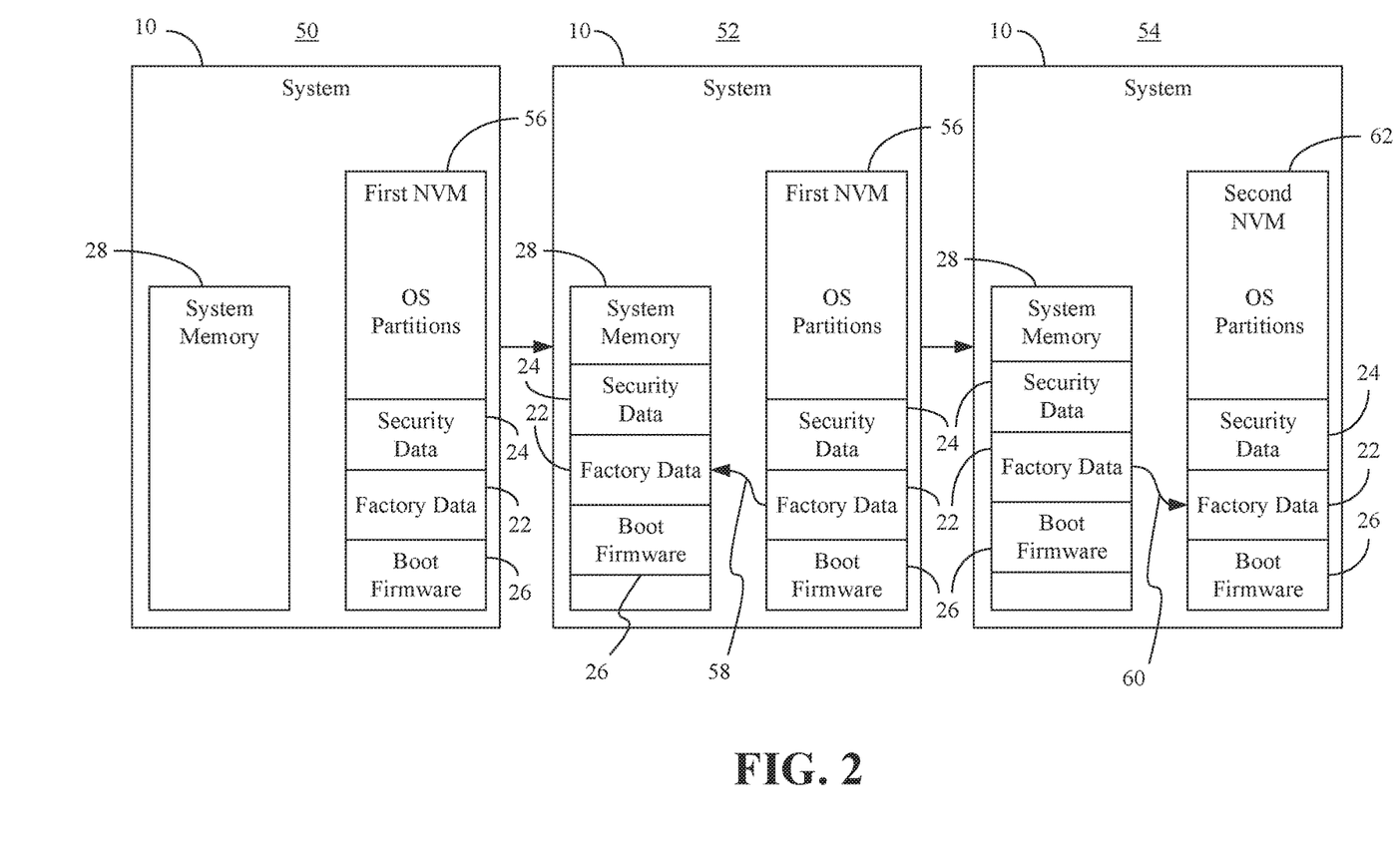
FIG. 2 is an illustration of an example of a data migration sequence according to an embodiment.

FIG. 2 demonstrates that during a boot stage 50, the storage context information may reside in respective partitions of a first non-volatile memory (NVM) 56 (e.g., PCIe NVME of a first storage device) of the system 10. During a first transfer stage 52, a first TEE-assisted allocation 58 identifies the respective partitions containing the storage context information and transfers the storage context information from the partitions in the first NVM 56 to the secure memory region in the system memory 28. During a second transfer stage 54, a second TEE-assisted allocation 60 transfers the storage context information from the secure memory region in the system memory 28 to a second NVM 62 in (e.g., PCIe NVME of a second storage device) of the system 10. The illustrated transfers may also involve writing OS images, OS recovery images, user data, etc., to other OS/miscellaneous partitions in the NVMs 56, 62.

Figure 3:
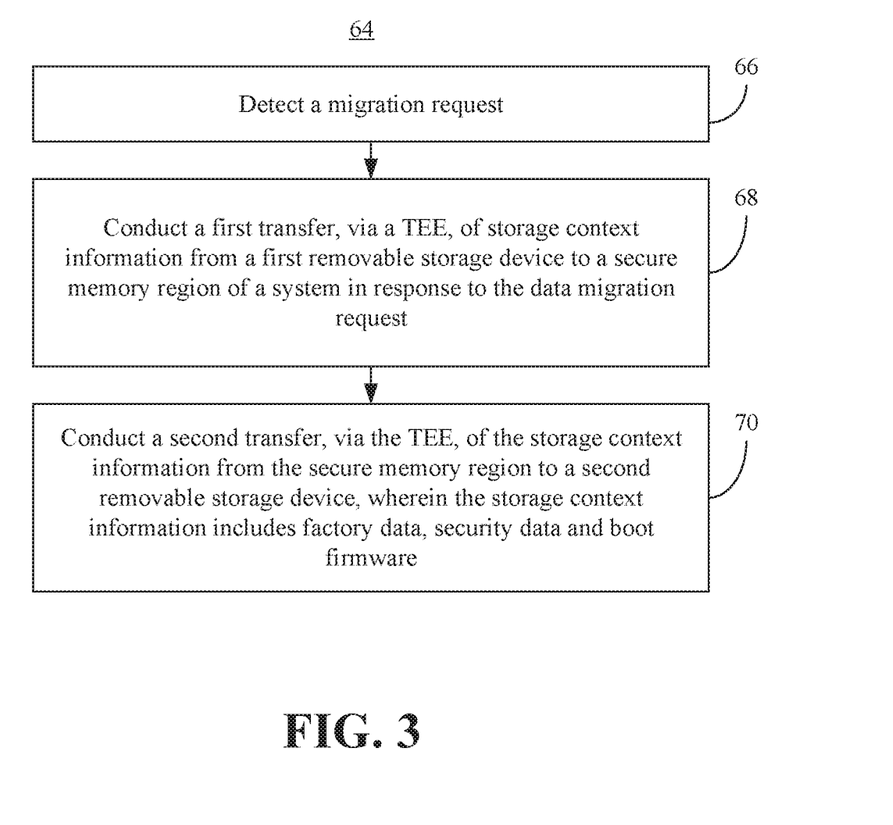
FIG. 3 is a flowchart of an example of a method of operating a data migration management apparatus according to an embodiment.

Turning now to FIG. 3, a method 64 of operating a data migration management apparatus is shown. The method 64 may generally be implemented in a data migration management apparatus such as, for example, the DM policy manager 12a (FIG. 1), already discussed. More particularly, the method 64 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 64 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 66 provides for detecting a data migration request. Block 66 may include detecting a change in, for example, a BIOS setup parameter, OS knob, UEFI shell command, etc., or any combination thereof. The data migration request may be associated with an upgrade from a first removable storage device to a second removable storage device, a capacity expansion that supplements a first storage device with a second removable storage device, and so forth. Additionally, block 68 may conduct a first transfer, via a TEE, of storage context information from the first removable storage device to a secure memory region of a system in response to the data migration request. Block 68 may also include confirming a completion of the first transfer and generating a user prompt in response to the completion of the first transfer, wherein the user prompt instructs a user to connect the second removable storage device to the system.

Block 70 conducts a second transfer, via the TEE, of the storage context information from the secure memory region to the second removable storage device. As already noted, the storage context information may include factory data, security data, boot firmware and/or other system data (e.g., OS images, OS recovery images, user data). In one example, block 70 includes writing the factory data to a factory partition in the second removable storage device, writing the security data to a security partition in the second removable storage device, writing the boot firmware to a boot partition in the second removable storage device, writing the OS image, the OS recovery image and the user data to one or more remaining partitions in the second removable storage device, and so forth. In a "hybrid boot" example, part of the boot firmware may be stored in Serial Peripheral Interface NOR (SPINOR), with the remaining components of the being stored in the boot partition. In such a case, block 70 may write only a portion of the boot firmware to the boot partition.

Additionally, block 70 may include instructing the TEE to provision the second removable storage device with an RPMB and/or associated key. Moreover, if the factory partition does not pre-exist in the second removable storage device, block 70 may include creating the factory partition in the second removable storage device. Block 70 may also provide for confirming a completion of the second transfer, invalidating the storage context information in the secure memory region in response to the completion of the second transfer, and triggering a cold reboot of the system in response to the completion of the second transfer.

Figure 4:
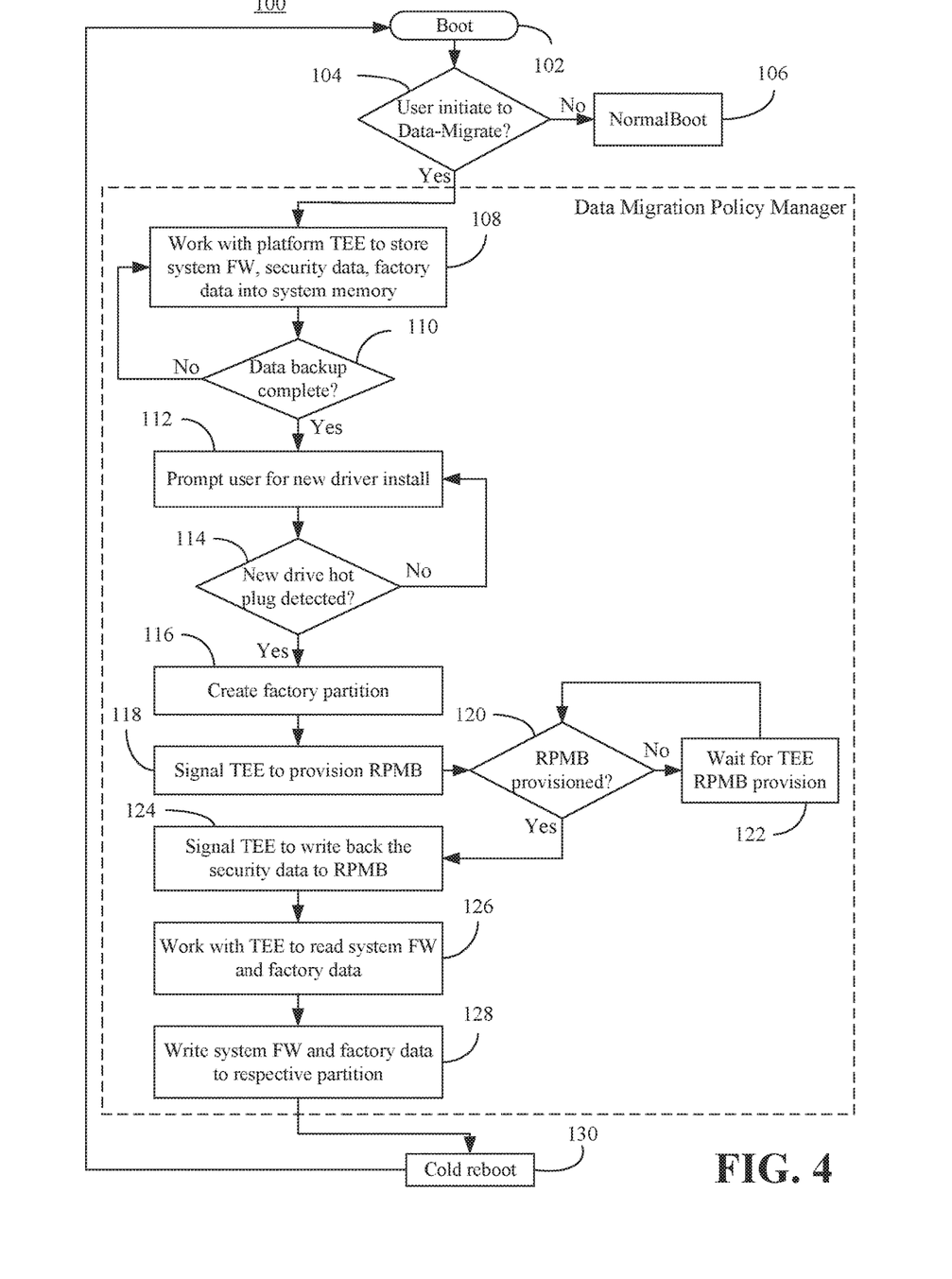
FIG. 4 is a flowchart of an example of a more detailed method of operating a data migration management apparatus according to an embodiment.

Turning now to FIG. 4, a more detailed method 100 of operating a data migration management apparatus is shown. Various aspects of the method 100 may generally be implemented in a data migration management apparatus such as, for example, the DM policy manager 12a (FIG. 1), already discussed. More particularly, the method 100 may be implemented as a module or related component in a set of logic instructions stored in a non-transitory machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 102 provides for initiating a system boot, wherein a determination may be made at block 104 as to whether a data migration request has been detected. If not, a normal boot is conducted at block 106. Otherwise, illustrated block 108 works/collaborates with a platform TEE to store system firmware, security data (e.g., certificate, key) and factory data into system memory. A determination may be made at block 110 as to whether the data backup is complete. If not, the illustrated method 100 returns to block 108. Upon completion of the data backup, block 112 may prompt a user for a new drive (e.g., removable storage device) installation. A determination may be made at block 114 as to whether a new drive hot plug event has been detected. If not, the illustrated method 100 returns to block 112.

Upon detection of the new drive hot plug event, block 116 may create a factory partition in the new drive, wherein illustrated block 118 signals/instructs the TEE to provision an RPMB for the new drive (e.g., as part of a drive initialization sequence). Block 120 may determine whether the RPMB has been provisioned. If not, illustrated block 122 waits for the TEE to provision the RPMB and the illustrated method 100 returns to block 120. Once the RPMB provisioning has been confirmed, block 124 may signal the TEE to write back the security data to the RPMB in the new drive. Additionally, block 126 may work with the TEE to read the system firmware and the factory data, wherein illustrated block 128 writes the system firmware and the factory data to their respective partitions in the new drive. A cold reboot may be triggered at block 130.

Figure 5A:
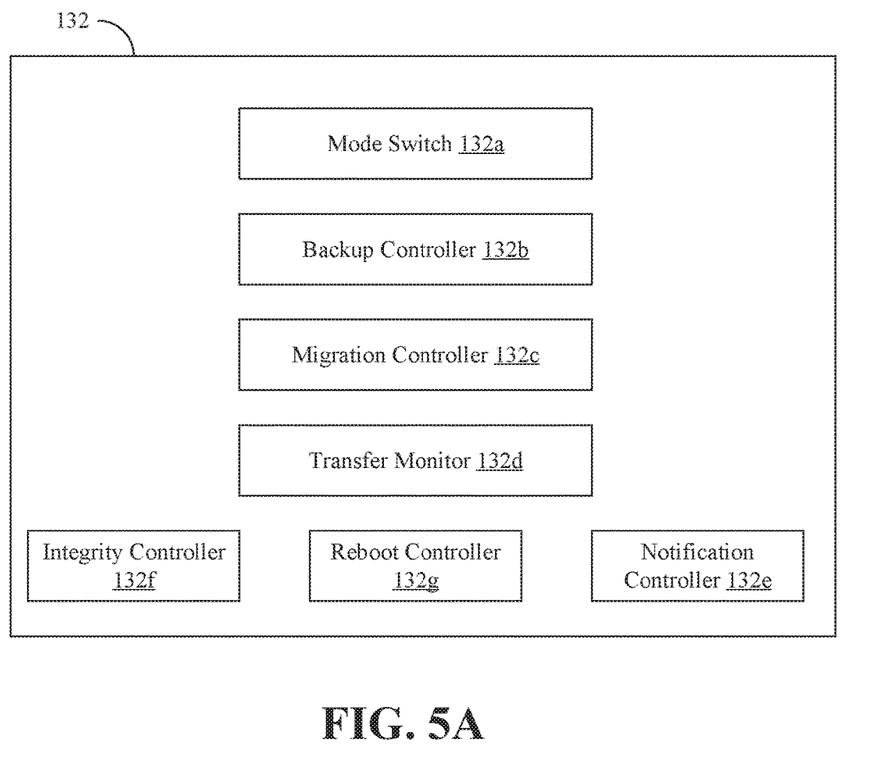
FIGS. 5A and 5B are block diagrams of examples of data migration management apparatuses according to embodiments.

FIG. 5A shows a data migration management apparatus 132 (132a-132g) that may implement one or more aspects of the method 64 (FIG. 3) and/or the method 100 (FIG. 4). The data migration management apparatus 132, which may include logic instructions, configurable logic, fixed-functionality hardware logic, may be readily substituted for the DM policy manager 12a (FIG. 1), already discussed. A mode switch 132a may detect a data migration request, wherein a backup controller 132b communicatively coupled to the mode switch 132a may conduct a first transfer, via a TEE, of storage context information (e.g., factory data, security data, boot firmware) from a first removable storage device to a secure memory region of a system in response to the data migration request. Thus, the mode switch 132a may automatically transition the apparatus 132 into a specialized boot mode in response to the data migration request. A migration controller 132c may conduct a second transfer, via the TEE, of the storage context information from the secure memory region to a second removable storage device.

Thus, the migration controller 132c may write the factory data to a factory partition in the second removable storage device, write the security data to a security partition in the second removable storage device, write the boot firmware to a boot partition in the second removable storage device, and write the OS image, the OS recovery image and the user data to one or more. Moreover, the migration controller 132c may create the factory partition in the second removable storage device.

In one example, a transfer monitor 132d confirms a completion of the first transfer, wherein a notification controller 132e communicatively coupled to the transfer monitor 132d generates a user prompt to connect the second removable storage device to the system in response to the completion of the first transfer. Additionally, the transfer monitor 132d may confirm a completion of the second transfer, wherein an integrity controller 132f communicatively coupled to the transfer monitor 132d invalidates the storage context information in the secure memory region in response to the completion of the second transfer. The illustrated apparatus 132 also includes a reboot controller 132g communicatively coupled to the transfer monitor 132d, wherein the reboot controller 132g triggers a cold reboot of the system in response to the completion of the second transfer.

Figure 5B:
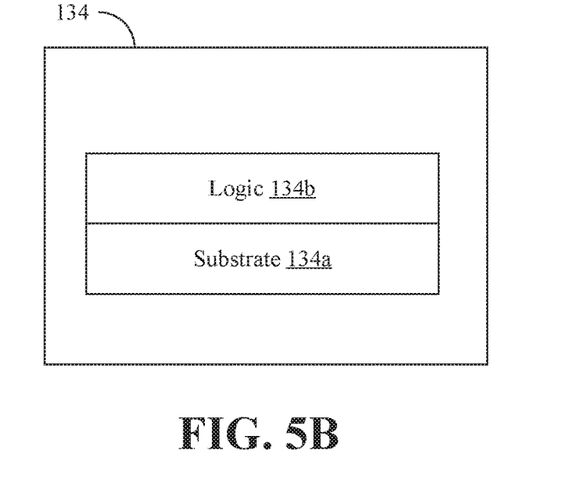

Turning now to FIG. 5B, data migration management apparatus 134 (134a, 134b) is shown in which logic 134b (e.g., transistor array and other integrated circuit/IC components) is coupled to a substrate 134a (e.g., silicon, sapphire, gallium arsenide). The logic 134b may generally implement one or more aspects of the method 64 (FIG. 3) and/or the method 100 (FIG. 4). Thus, the logic 134b may detect a data migration request and conduct a first transfer, via a TEE, of storage context information from a first removable storage device to a secure memory region of a system in response to the data migration request. Additionally, the logic 134b may conduct a second transfer, via the TEE, of the storage context information from the secure memory region to a second removable storage device, wherein the storage context information includes factory data, security data and boot firmware. In one example, the apparatus 134 is a semiconductor die, chip and/or package.

Figure 6:
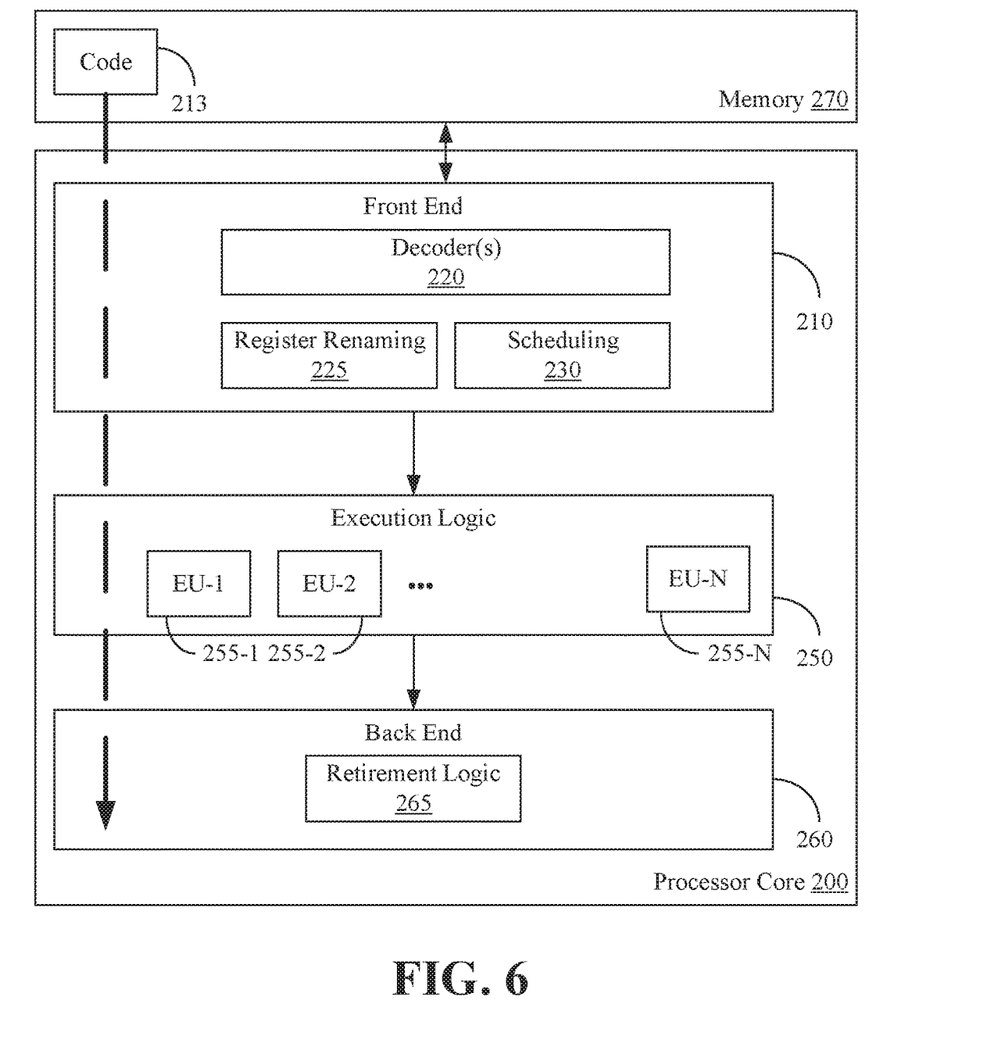
FIG. 6 is a block diagram of an example of a processor according to an embodiment.

FIG. 6 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 6, a processing element may alternatively include more than one of the processor core 200 illustrated in FIG. 6. The processor core 200 may be a single-threaded core or, for at least one embodiment, the processor core 200 may be multithreaded in that it may include more than one hardware thread context (or "logical processor") per core.

FIG. 6 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 64 (FIG. 3) and/or the method 100 (FIG. 4), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 6, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 7:
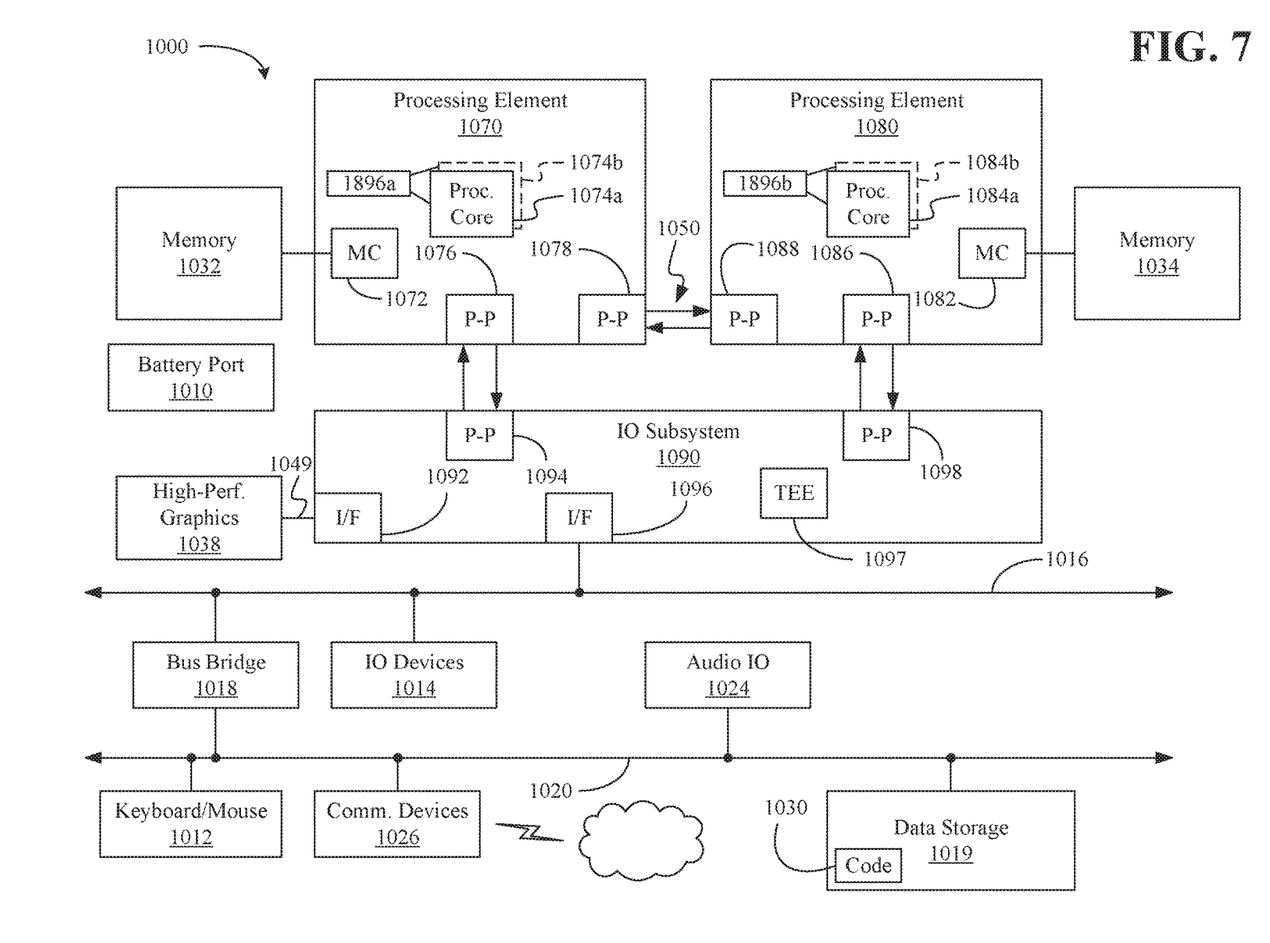
FIG. 7 is a block diagram of an example of a system according to an embodiment.

Referring now to FIG. 7, shown is a block diagram of a system 1000 embodiment in accordance with an embodiment. Shown in FIG. 7 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 7 may be implemented as a multi-drop bus rather than point-to-point interconnect.

As shown in FIG. 7, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 6.

Each processing element 1070, 1080 may include at least one shared cache 1896a, 1896b (e.g., static random access memory/SRAM). The shared cache 1896a, 1896b may store data (e.g., objects, instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 7, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 7, the I/O subsystem 1090 includes a TEE 1097 (e.g., security controller) and P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 7, various I/O devices 1014 (e.g., cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, network controllers/communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement one or more aspects of the method 64 (FIG. 3) and/or the method 100 (FIG. 4), already discussed, and may be similar to the code 213 (FIG. 6), already discussed. Further, an audio I/O 1024 may be coupled to second bus 1020.

Note that other embodiments are contemplated. For example, instead of the point-to-point architecture of FIG. 7, a system may implement a multi-drop bus or another such communication topology.

ADDITIONAL NOTES AND EXAMPLES

Example 1 may include a storage based computing system comprising a system memory device including a secure memory region, a trusted execution environment and a data migration management apparatus communicatively coupled to the trusted execution environment, the data migration management apparatus including a mode switch to detect a data migration request, a backup controller communicatively coupled to the mode switch, the backup controller to conduct a first transfer, via the trusted execution environment, of storage context information from a first removable storage device to the secure memory region in response to the data migration request, and a migration controller to conduct a second transfer, via the trusted execution environment, of the storage context information from the secure memory region to a second removable storage device, wherein the storage context information is to include factory data, security data and boot firmware.

Example 2 may include the system of Example 1, wherein the storage context information is to further include an operating system (OS) image, an OS recovery image and user data, and wherein the migration controller is to write the factory data to a factory partition in the second removable storage device, write the security data to a security partition in the second removable storage device, write the boot firmware to a boot partition in the second removable storage device, and write the OS image, the OS recovery image and the user data to one or more remaining partitions in the second removable storage device.

Example 3 may include the system of Example 2, wherein the migration controller is to create the factory partition in the second removable storage device.

Example 4 may include the system of Example 1, wherein the migration controller is to instruct the trusted execution environment to provision the second removable storage device with a replay protected memory block.

Example 5 may include the system of any one of Examples 1 to 4, wherein the data migration management apparatus further includes a transfer monitor to confirm a completion of the first transfer, and a notification controller communicatively coupled to the transfer monitor, the notification component to generate a user prompt to connect the second removable storage device to the system in response to the completion of the first transfer.

Example 6 may include the system of any one of Examples 1 to 4, wherein the data migration management apparatus further includes a transfer monitor to confirm a completion of the second transfer, an integrity controller communicatively coupled to the transfer monitor, the integrity controller to invalidate the storage context information in the secure memory region in response to the completion of the second transfer, and a reboot controller communicatively coupled to the transfer monitor, the reboot controller to trigger a cold reboot of the system in response to the completion of the second transfer.

Example 7 may include a data migration management apparatus comprising a mode switch to detect a data migration request, a backup controller communicatively coupled to the mode switch, the backup controller to conduct a first transfer, via a trusted execution environment, of storage context information from a first removable storage device to a secure memory region of a system, and a migration controller to conduct a second transfer, via the trusted execution environment, of the storage context information from the secure memory region to a second removable storage device, wherein the storage context information is to include factory data, security data and boot firmware.

Example 8 may include the apparatus of Example 7, wherein the storage context information is to further include an operating system (OS) image, an OS recovery image and user data, and wherein the migration controller is to write the factory data to a factory partition in the second removable storage device, write the security data to a security partition in the second removable storage device, write the boot firmware to a boot partition in the second removable storage device, and write the OS image, the OS recovery image and the user data to one or more remaining partitions in the second removable storage device.

Example 9 may include the apparatus of Example 8, wherein the migration controller is to create the factory partition in the second removable storage device.

Example 10 may include the apparatus of Example 7, wherein the migration controller is to instruct the trusted execution environment to provision the second removable storage device with a replay protected memory block.

Example 11 may include the apparatus of any one of Examples 7 to 10, further including a transfer monitor to confirm a completion of the first transfer, and a notification controller communicatively coupled to the transfer monitor, the notification component to generate a user prompt to connect the second removable storage device to the system in response to the completion of the first transfer.

Example 12 may include the apparatus of any one of Examples 7 to 10, further including a transfer monitor to confirm a completion of the second transfer, an integrity controller communicatively coupled to the transfer monitor, the integrity controller to invalidate the storage context information in the secure memory region in response to the completion of the second transfer, and a reboot controller communicatively coupled to the transfer monitor, the reboot controller to trigger a cold reboot of the system in response to the completion of the second transfer.

Example 13 may include a method of operating a data migration management apparatus, comprising detecting a data migration request, conducting a first transfer, via a trusted execution environment, of storage context information from a first removable storage device to a secure memory region of a system in response to the data migration request, and conducting a second transfer, via the trusted execution environment, of the storage context information from the secure memory region to a second removable storage device, wherein the storage context information includes factory data, security data and boot firmware.

Example 14 may include the method of Example 13, wherein the storage context information further includes an operating system (OS) image, an OS recovery image and user data, and wherein conducting the second transfer includes writing the factory data to a factory partition in the second removable storage device, writing the security data to a security partition in the second removable storage device, writing the boot firmware to a boot partition in the second removable storage device, and writing the OS image, the OS recovery image and the user data to one or more remaining partitions in the second removable storage device.

Example 15 may include the method of Example 14, further including creating the factory partition in the second removable storage device.

Example 16 may include the method of Example 13, wherein conducting the second transfer includes instructing the trusted execution environment to provision the second removable storage device with a replay protected memory block.

Example 17 may include the method of any one of Examples 13 to 16, further including confirming a completion of the first transfer, and generating a user prompt to connect the second removable storage device to the system in response to the completion of the first transfer.

Example 18 may include the method of any one of Examples 13 to 16, further including confirming a completion of the second transfer, invalidating the storage context information in the secure memory region in response to the completion of the second transfer, and triggering a cold reboot of the system in response to the completion of the second transfer.

Example 19 may include at least one computer readable storage medium comprising a set of instructions, which when executed by a computing system, cause the computing system to detect a data migration request, conduct a first transfer, via a trusted execution environment, of storage context information from a first removable storage device to a secure memory region of the computing system, and conduct a second transfer, via the trusted execution environment, of the storage context information from the secure memory region to a second removable storage device, wherein the storage context information is to include factory data, security data and boot firmware.

Example 20 may include the at least one computer readable storage medium of Example 19, wherein the storage context information is to further include an operating system (OS) image, an OS recovery image and user data, and wherein the instructions, when executed, cause the computing system to write the factory data to a factory partition in the second removable storage device, write the security data to a security partition in the second removable storage device, write the boot firmware to a boot partition in the second removable storage device, and write the OS image, the OS recovery image and the user data to one or more remaining partitions in the second removable storage device.

Example 21 may include the at least one computer readable storage medium of Example 20, wherein the instructions, when executed, cause the computing system to create the factory partition in the second removable storage device.

Example 22 may include the at least one computer readable storage medium of Example 19, wherein the instructions, when executed, cause the computing system to instruct the trusted execution environment to provision the second removable storage device with a replay protected memory block.

Example 23 may include the at least one computer readable storage medium of any one of Examples 19 to 22, wherein the instructions, when executed, cause the computing system to confirm a completion of the first transfer, and generate a user prompt to connect the second removable storage device to the system in response to the completion of the first transfer.

Example 24 may include the at least one computer readable storage medium of any one of Examples 19 to 22, wherein the instructions, when executed, cause the computing system to confirm a completion of the second transfer, invalidate the storage context information in the secure memory region in response to the completion of the second transfer, and trigger a cold reboot of the system in response to the completion of the second transfer.

Example 25 may include a data migration management apparatus comprising means for detecting a data migration request, means for conducting a first transfer, via a trusted execution environment, of storage context information from a first removable storage device to a secure memory region of a system in response to the data migration request, and means for conducting a second transfer, via the trusted execution environment, of the storage context information from the secure memory region to a second removable storage device, wherein the storage context information includes factory data, security data and boot firmware.

Example 26 may include the apparatus of Example 25, wherein the means for conducting the second transfer includes means for writing the factory data to a factory partition in the second removable storage device, means for writing the security data to a security partition in the second removable storage device, and means for writing at least a portion of the boot firmware to a boot partition in the second removable storage device.

Example 27 may include the apparatus of Example 26, further including means for creating the factory partition in the second removable storage device.

Example 28 may include the apparatus of Example 25, wherein the means for conducting the second transfer includes means for instructing the trusted execution environment to provision the second removable storage device with a replay protected memory block.

Example 29 may include the apparatus of any one of Examples 25 to 28, further including means for confirming a completion of the first transfer, and means for generating a user prompt to connect the second removable storage device to the system in response to the completion of the first transfer.

Example 30 may include the apparatus of any one of Examples 25 to 28, further including means for confirming a completion of the second transfer, means for invalidating the storage context information in the secure memory region in response to the completion of the second transfer, and means for triggering a cold reboot of the system in response to the completion of the second transfer.

Thus, technology described herein may automatically migrate storage context information between storage media without the use of extra hardware and/or software tools to facilitate the storage upgrade. Additionally, system firmware may be given the ability to support on-the-fly upgrades of storage devices and the ability to work with a platform TEE to automatically provision secure partitions (e.g., RPMBs). Moreover, system firmware may be given the ability to automatically migrate storage context data between storage devices to support the expansion of storage with the second storage device. In addition, system firmware may be given the ability to extend this capability to any PCIe/other storage driver that supports boot/RPMB and general purpose partition (GPP) support. The technology may also simplify SoC design as it consolidates all SoC controllers into PCIe based storage. The technology may also be used for redundant array of independent disks (RAID) type of imaging on different PCIe NVME storage devices (e.g., migrating data while both existing and new PCIe NVME storage devices are plugged into the system).

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A method comprising:
    detecting a data migration request;
    conducting a first transfer, via a trusted execution environment, of storage context information from a first removable storage device to a secure memory region of a system in response to the data migration request; and
    conducting a second transfer, via the trusted execution environment, of the storage context information from the secure memory region to a second removable storage device, wherein the storage context information includes factory data, security data and boot firmware.

2. The method of claim 1, wherein the storage context information further includes an operating system (OS) image, an OS recovery image and user data, and wherein conducting the second transfer includes:
    writing the factory data to a factory partition in the second removable storage device;
    writing the security data to a security partition in the second removable storage device;
    writing the boot firmware to a boot partition in the second removable storage device; and
    writing the OS image, the OS recovery image and the user data to one or more remaining partitions in the second removable storage device.

3. The method of claim 2, further including creating the factory partition in the second removable storage device.

4. The method of claim 1, wherein conducting the second transfer includes instructing the trusted execution environment to provision the second removable storage device with a replay protected memory block.

5. The method of claim 1, further including:
    confirming a completion of the first transfer; and
    generating a user prompt to connect the second removable storage device to the system in response to the completion of the first transfer.

6. The method of claim 1, further including:
    confirming a completion of the second transfer;
    invalidating the storage context information in the secure memory region in response to the completion of the second transfer; and
    triggering a cold reboot of the system in response to the completion of the second transfer.

7. At least one non-transitory computer readable storage medium comprising a set of instructions, which when executed by a computing system, cause the computing system to:
    detect a data migration request;
    conduct a first transfer, via a trusted execution environment, of storage context information from a first removable storage device to a secure memory region of the computing system; and
    conduct a second transfer, via the trusted execution environment, of the storage context information from the secure memory region to a second removable storage device, wherein the storage context information is to include factory data, security data and boot firmware.

8. The at least one non-transitory computer readable storage medium of claim 7, wherein the storage context information is to further include an operating system (OS) image, an OS recovery image and user data, and wherein the instructions, when executed, cause the computing system to:
    write the factory data to a factory partition in the second removable storage device;
    write the security data to a security partition in the second removable storage device;
    write the boot firmware to a boot partition in the second removable storage device; and
    write the OS image, the OS recovery image and the user data to one or more remaining partitions in the second removable storage device.

9. The at least one non-transitory computer readable storage medium of claim 8, wherein the instructions, when executed, cause the computing system to create the factory partition in the second removable storage device.

10. The at least one non-transitory computer readable storage medium of claim 7, wherein the instructions, when executed, cause the computing system to instruct the trusted execution environment to provision the second removable storage device with a replay protected memory block.

11. The at least one non-transitory computer readable storage medium of claim 7, wherein the instructions, when executed, cause the computing system to:
    confirm a completion of the first transfer; and generate a user prompt to connect the second removable storage device to the system in response to the completion of the first transfer.

12. The at least one non-transitory computer readable storage medium of claim 7, wherein the instructions, when executed, cause the computing system to:
confirm a completion of the second transfer;
invalidate the storage context information in the secure memory region in response to the completion of the second transfer; and
trigger a cold reboot of the system in response to the completion of the second transfer.

13. An apparatus comprising:
a mode switch, implemented at least partly in the one or more of configurable logic or fixed functionality logic hardware, to detect a data migration request;
a backup controller, implemented at least partly in the one or more of configurable logic or fixed functionality logic hardware, communicatively coupled to the mode switch, the backup controller to conduct a first transfer, via a trusted execution environment, of storage context information from a first removable storage device to a secure memory region of a system; and
a migration controller, implemented at least partly in the one or more of configurable logic or fixed functionality logic hardware, to conduct a second transfer, via the trusted execution environment, of the storage context information from the secure memory region to a second removable storage device, wherein the storage context information is to include factory data, security data and boot firmware.

14. The apparatus of claim 13, wherein the storage context information is to further include an operating system (OS) image, an OS recovery image and user data, and wherein the migration controller is to write the factory data to a factory partition in the second removable storage device, write the security data to a security partition in the second removable storage device, write the boot firmware to a boot partition in the second removable storage device, and write the OS image, the OS recovery image and the user data to one or more remaining partitions in the second removable storage device.

15. The apparatus of claim 14, wherein the migration controller is to create the factory partition in the second removable storage device.

16. The apparatus of claim 13, wherein the migration controller is to instruct the trusted execution environment to provision the second removable storage device with a replay protected memory block.

17. The apparatus of claim 13, further including:
a transfer monitor, implemented at least partly in the one or more of configurable logic or fixed functionality logic hardware, to confirm a completion of the first transfer; and
a notification controller, implemented at least partly in the one or more of configurable logic or fixed functionality logic hardware, communicatively coupled to the transfer monitor, the notification component to generate a user prompt to connect the second removable storage device to the system in response to the completion of the first transfer.

18. The apparatus of claim 13, further including:
a transfer monitor, implemented at least partly in the one or more of configurable logic or fixed functionality logic hardware, to confirm a completion of the second transfer;
an integrity controller, implemented at least partly in the one or more of configurable logic or fixed functionality logic hardware, communicatively coupled to the transfer monitor, the integrity controller to invalidate the storage context information in the secure memory region in response to the completion of the second transfer; and
a reboot controller, implemented at least partly in the one or more of configurable logic or fixed functionality logic hardware, communicatively coupled to the transfer monitor, the reboot controller to trigger a cold reboot of the system in response to the completion of the second transfer.

19. A system comprising:
a system memory device including a secure memory region;
a trusted execution environment; and
a data migration management apparatus communicatively coupled to the trusted execution environment, the data migration management apparatus including:
a mode switch to detect a data migration request,
a backup controller communicatively coupled to the mode switch, the backup controller to conduct a first transfer, via the trusted execution environment, of storage context information from a first removable storage device to the secure memory region, and
a migration controller to conduct a second transfer, via the trusted execution environment, of the storage context information from the secure memory region to a second removable storage device, wherein the storage context information is to include factory data, security data and boot firmware.

20. The system of claim 19, wherein the storage context information is to further include an operating system (OS) image, an OS recovery image and user data, and wherein the migration controller is to write the factory data to a factory partition in the second removable storage device, write the security data to a security partition in the second removable storage device, write the boot firmware to a boot partition in the second removable storage device, and write the OS image, the OS recovery image and the user data to one or more remaining partitions in the second removable storage device.

21. The system of claim 20, wherein the migration controller is to create the factory partition in the second removable storage device.

22. The system of claim 19, wherein the migration controller is to instruct the trusted execution environment to provision the second removable storage device with a replay protected memory block.

23. The system of claim 19, wherein the data migration management apparatus further includes:
a transfer monitor to confirm a completion of the first transfer; and
a notification controller communicatively coupled to the transfer monitor, the notification component to generate a user prompt to connect the second removable storage device to the system in response to the completion of the first transfer.

24. The system of claim 19, wherein the data migration management apparatus further includes:
a transfer monitor to confirm a completion of the second transfer;
an integrity controller communicatively coupled to the transfer monitor, the integrity controller to invalidate the storage context information in the secure memory region in response to the completion of the second transfer; and a reboot controller communicatively coupled to the transfer monitor, the reboot controller to trigger a cold reboot of the system in response to the completion of the second transfer.

* * * * *